(12) United States Patent
Hidaka et al.

(10) Patent No.: US 9,291,442 B2
(45) Date of Patent: Mar. 22, 2016

(54) CONTOUR MEASURING APPARATUS

(71) Applicant: MITUTOYO CORPORATION, Kawasaki-shi, Kanagawa (JP)

(72) Inventors: Hiroyuki Hidaka, Miyazaki (JP); Mitsuhisa Nakano, Nagoya (JP); Hideki Kai, Nagoya (JP)

(73) Assignee: MITUTOYO CORPORATION, Kawasaki-Shi (JP)

( * ) Notice: Subject to any disclaimer, the term of this patent is extended or adjusted under 35 U.S.C. 154(b) by 92 days.

(21) Appl. No.: 14/220,883

(22) Filed: Mar. 20, 2014

(65) Prior Publication Data
US 2014/0283402 A1    Sep. 25, 2014

(30) Foreign Application Priority Data
Mar. 25, 2013   (JP) ................. 2013-062339

(51) Int. Cl.
*G01B 5/20* (2006.01)
*G01B 21/04* (2006.01)
*G01B 21/30* (2006.01)
*G01B 5/28* (2006.01)

(52) U.S. Cl.
CPC .. *G01B 5/20* (2013.01); *G01B 5/28* (2013.01); *G01B 21/047* (2013.01); *G01B 21/30* (2013.01)

(58) Field of Classification Search
CPC .......... G01B 5/20; G01B 5/28; G01B 21/047; G01B 21/30
USPC ............................ 33/200, 507, 551, 553, 554
See application file for complete search history.

(56) References Cited

U.S. PATENT DOCUMENTS

| | | | | |
|---|---|---|---|---|
| 4,066,266 A | * | 1/1978 | Anley | 369/250 |
| 6,354,012 B1 | * | 3/2002 | Pettersson | 33/503 |
| 6,874,243 B2 | * | 4/2005 | Hama et al. | 33/551 |
| 7,681,323 B2 | * | 3/2010 | Liu et al. | 33/503 |
| 8,701,301 B2 | * | 4/2014 | Nakayama et al. | 33/554 |
| 8,915,124 B2 | * | 12/2014 | Nakayama | 33/554 |

FOREIGN PATENT DOCUMENTS

| | | |
|---|---|---|
| EP | 1353215 | 10/2003 |
| GB | 2092753 | 8/1982 |
| JP | 2004-077437 | 3/2004 |

OTHER PUBLICATIONS

European Search Report dated Jul. 10, 2014, 6 pages.

* cited by examiner

*Primary Examiner* — G. Bradley Bennett
(74) *Attorney, Agent, or Firm* — Rankin, Hill & Clark LLP

(57) ABSTRACT

A contour measuring apparatus includes: an arm including a stylus in a distal end and being swingable with respect to a cabinet; an attitude change mechanism configured to change an attitude of the arm within a swing range; a stopper configured to make contact with the arm when the arm moves nearer to an installation part of an object to be measured within the swing range; and a controller configured to operate the attitude change mechanism based on a power-off command and return the arm to a mechanical limit position in which the arm makes contact with the stopper.

10 Claims, 5 Drawing Sheets

CONTOUR MEASURING APPARATUS

CROSS-REFERENCE TO RELATED APPLICATION(S)

This application is based upon and claims the benefit of priority from Japanese Patent Application No. 2013-062339, filed on Mar. 25, 2013, the entire contents of which are incorporated herein by reference.

BACKGROUND

1. Field of the Invention

The present invention relates to a contour measuring apparatus, and to an apparatus for measuring a contour shape of an object to he measured.

2. Description of the Related Art

Conventionally, a surface property measuring apparatus is used in order to measure properties of a surface, a contour shape, surface roughness, etc. of an object to be measured. The surface property measuring apparatus is an apparatus for tracing a surface of the object to be measured with a stylus of the distal end of an arm and detecting unevenness of each position of the surface by displacement of the stylus in that case and capturing the unevenness as data. As such a surface property measuring apparatus, a contour measuring apparatus for measuring the contour shape of the object to be measured is used.

The known contour measuring apparatus is an apparatus including an arm having a stylus in the distal end, a support mechanism for swingably supporting the arm by bearings, an attitude change mechanism for changing an attitude of the arm and holding the arm in any position within the swing range, a measuring force giving mechanism for urging the arm so that the stylus makes contact with an object to be measured by a predetermined measuring force, and a detector for detecting a swing of the arm as a detecting part (see JP-A-2004-77437).

In JP-A-2004-77437, a cam mechanism abutting on the vicinity of the end opposite to the stylus of the arm is used as the attitude change mechanism. Also, in the measuring force giving mechanism, for example, a coil spring, whose one end is fixed to the vicinity of the support mechanism, arranged an parallel with a shaft of the arm as used as urging means for urging the arm in a swing direction.

In such a contour measuring apparatus, in a state (measurement position) in which the stylus makes contract with a surface of the object to be measured in the side proximal to the object to be measured, the arm is swingably arranged and the stylus is relatively moved along the surface of the object to be measured to thereby measure a contour shape of the object to be measured.

In the case of installing or taking out the object to be measured, the arm is retreated in a position distant from the object to be measured by the attitude change mechanism.

In the conventional contour measuring apparatus described above, when a power source is turned off after measurement work, each of the parts including the arm stops in a state just before the power source is turned off.

The arm may take an attitude distant from the object to be measured (or its installation part) in order to handle the object to be measured as described above, and in the case of stopping in this state, a distance between the arm and the installation part of the object to he measured remains increased.

When the arm stops with the distance increased, there are problems that, for example, a foreign substance gets into this distance (gap between the stylus and the arm, and the object to be measured or its installation part) or a worker touches accidentally and the stylus may break or chip due to an external force.

In the case of damaging the arm, for example, slightly bending the arm even when the stylus does not chip, high-accuracy measurement of the object to be measured cannot be made, with the result that replacement work of the arm is required and operational costs also increase.

As measures against such a stop state, attention is called to a worker manipulating the contour measuring apparatus so as to perform a manipulation of moving the stylus and the arm nearer to the installation part of the object to be measured in the case of turning off a power source after the completion of work.

However, since the attention only depends on artificial work, the manipulation may not be performed due to manipulation loss of the worker even when the attention is called, and a solution is not reached.

Incidentally, a detector for detecting swing displacement of the arm of the contour measuring apparatus includes an absolute type detector and an incremental type detector. The incremental type detector is well used since the incremental type detector is more inexpensive than the absolute type detector.

However, the incremental type detector has problems of being difficult to reduce processing and shorten time since origin return operation is indispensable every time the power source is turned on.

SUMMARY

An object of the invention is to provide a contour measuring apparatus capable of preventing damage to an arm or a chip on a stylus due to an external force. Also, another primary object of the invention is to provide a contour measuring apparatus capable of eliminating the need for origin return operation at the time of starting even in the case of using an incremental type detector.

A contour measuring apparatus of the invention is characterized by including an arm which has a stylus in a distal end and is swingable with respect to a cabinet, an attitude change mechanism for changing an attitude of the arm within a swing range, a stopper for making contact with the arm when the arm moves nearer to an installation part of an object to be measured within the swing range, and a controller for operating the attitude change mechanism based on a power-off command and returning the arm to a mechanical limit position in which the arm makes contact with the stopper.

According to this invention, since the arm is automatically returned to the mechanical limit position at the time of turning of a power source, a distance between the stylus and the installation part of the object to be measured can be decreased. Particularly, when the arm is returned to the mechanical limit position in which the arm moves nearest to the installation part of the object to be measured, the distance between the stylus and the installation, part of the object to be measured can be minimized. Consequently, the possibility that a foreign substance is interposed between the stylus and the installation part and also a person touches unexpectedly can be reduced greatly, and damage to the arm or a chip on the stylus due to an external force can be prevented.

Also, replacement work associated with the damage to the arm or the chip on the stylus can be eliminated and also, an increase in operational costs can be avoided and further, the need to call attention to a worker in the case of turning off the power source can be eliminated.

The contour measuring apparatus of the invention preferably includes an incremental type detector for detecting displacement of the arm, and the controller is constructed so that an arm position at the time of turning on a power source is set as the origin.

According to this invention, even in the case of using the incremental type detector, the arm position at the time of turning on the power source, that is, the mechanical limit position is set as the origin as it is and thereby, the need for origin return operation at the time of starting can be eliminated. Consequently, processing can be reduced and time can be shortened.

The contour measuring apparatus of the invention preferably further includes a cover member for covering the stylus of the arm present in the mechanical limit position.

According to this invention, the stylus can be protected by the cover member at the time of turning off the power source and accordingly, an unintended external force can more surely be prevented from being applied to the stylus.

According to the invention, the contour measuring apparatus capable of preventing damage to the arm or a chip on the stylus due to an external force can be provided. Also, according to the invention, the contour measuring apparatus capable of eliminating the need for the origin return operation at the time of starting even in the case of using the incremental type detector can be provided.

BRIEF DESCRIPTION OF THE DRAWINGS

The present invention will become more fully understood from the detailed description given hereinbelow and the accompanying drawing which is given by way of illustration only, and thus is not limitative of the present invention and wherein.

DETAILED DESCRIPTION OF THE INVENTION

Embodiments of the invention will hereinafter be described based on the drawings.

[First Embodiment]

FIGS. 1 to 4 show a first embodiment of the invention.

Figure 1:
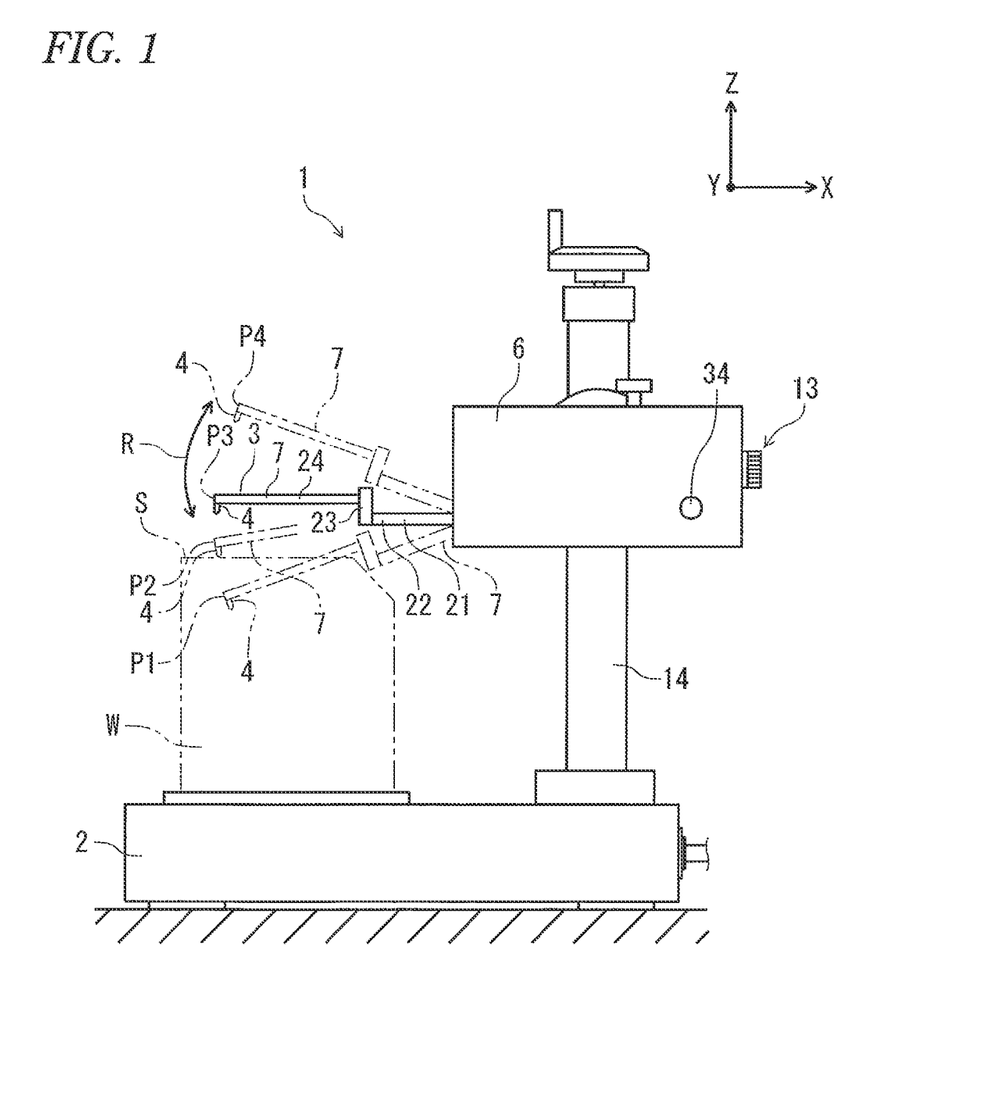
FIG. 1 is a front view showing a contour measuring apparatus according to a first embodiment of the invention.
Figure 2:
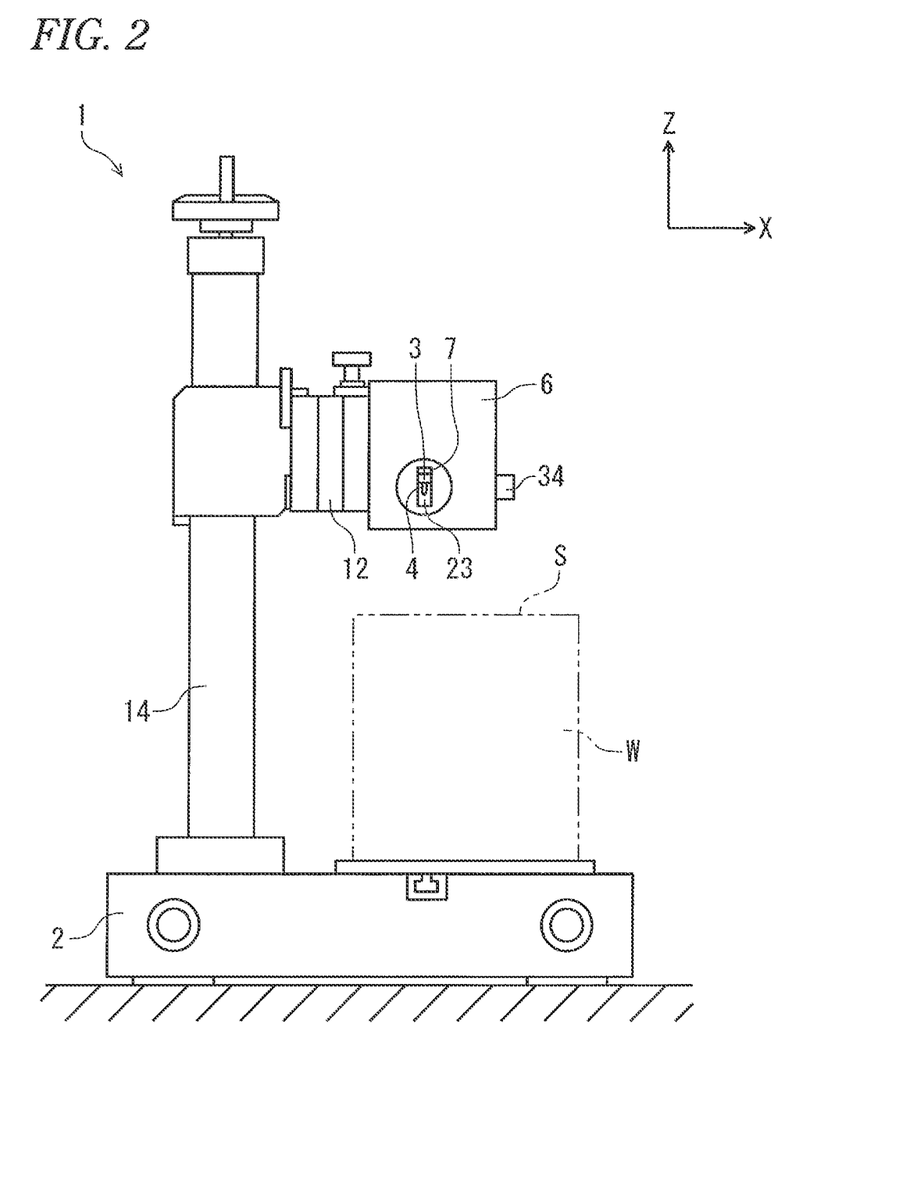
FIG. 2 is a side view showing the contour measuring apparatus according to the first embodiment.

In FIGS. 1 and 2, a contour measuring apparatus 1 is an apparatus for measuring a contour shape of work W placed on a table 2 as an installation part of the work (object to be measured) W.

Figure 3:
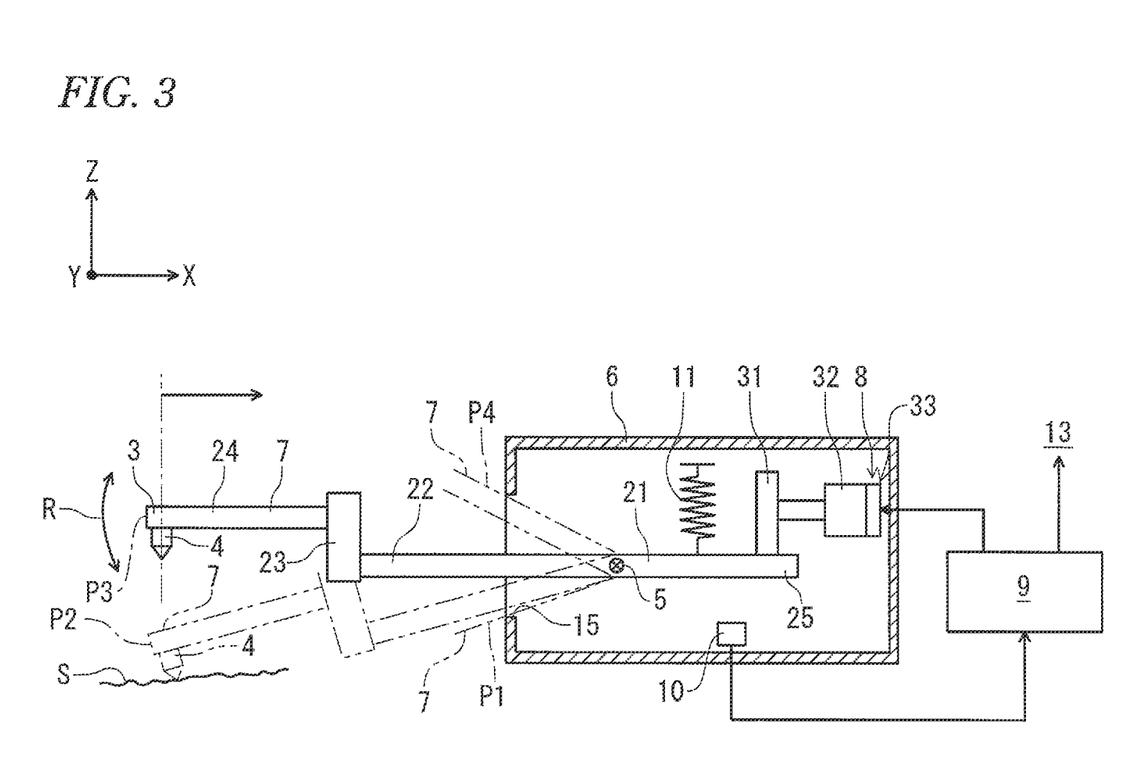
FIG. 3 is an enlarged schematic view showing a main part of the first embodiment.

In FIG. 3, the contour measuring apparatus 1 includes an arm 7 having a stylus (sensing pin) 4 in the distal end 3, an arm lifter 8 formed as an attitude change mechanism, a stopper 15 for stopping the arm 7, and a controller 9 for controlling the arm lifter 8.

Also, the contour measuring apparatus 1 includes an incremental type detector 10 for detecting displacement of the arm 7, and a measuring force giving mechanism 11 for generating a force of a direction of moving nearer to the work W in the arm 7 and bringing the stylus 4 into contact with a work surface S.

In operation of measuring a contour shape of the work W in an X-Z plane, the stylus 4 formed on the arm 7 arranged in a measurement position P2 is moved in a measurement direction (X-axis direction in the present embodiment) with the stylus 4 brought into contact with the work surface S. The operation is performed by detecting displacement of the stylus 4 in a Z-axis direction based on a swing of the arm 7 with this movement.

In the present embodiment, the lowest limit position of the arm 7 at the time of swinging downwardly and making contact with the stopper 15, that is, a mechanical limit position is set in a pause position P1 in FIG. 3. This position is in a state in which the stylus 4 moves nearest to the table 2.

The measurement position P2 is a position in which the stylus 4 of the arm 7 in a swingable state makes contact with the work surface S, and is the position slightly upper than the pause position P1.

An intermediate position P3 is a position of the middle in a swing range of the arm 7, and is the position upper than the measurement position P2 in a state in which the arm 7 extends in a horizontal direction.

A separation position P4 is a position of the arm 7 separate from the work W in the swing range, and is the position upper than the intermediate position P3.

The stylus 4 has a generally round bar shape, and the distal end of the stylus 4 is formed in a shape obtained by cutting the circular cylinder obliquely in the axial direction thereof, and the material is formed of cemented carbide, and abrasion resistance and low frictional properties are ensured.

A cabinet 6 is supported by a support 12, and can be moved in the X-axis direction by a feed mechanism 13 installed in the support 12. This cabinet 6 is provided with a power-off switch 34.

In addition, the cabinet 6 is not necessarily provided with the power-off switch 34, and the power-off switch 34 has only to be installed in any region of the contour measuring apparatus 1.

The support 12 is supported by a column 14 extending in the Z-axis direction installed on the table 2 or adjacently to the table 2. The support 12 can move up and down in the Z-axis direction along the column 14. Or, the contour measuring apparatus 1 may be configured to be installed by arranging the support 12 in the vicinity of the table 2 without using the column 14, and may have any configuration as long as the stylus 4 can make contact with the work surface S and movement in the X-axis direction can be performed.

The feed mechanism 13 is a mechanism for moving the cabinet 6 to the support 12 in order to perform the measurement operation described above. As the feed mechanism 13, for example, a mechanical precision feed mechanism using a ball screw etc. extending in the X-axis direction can be used, and a mechanism capable of linear movement and high-precision arrangement, for example, a linear motor may be used.

The arm 7 has an arm proximal part 21 and an arm body part 24 extending in the X-axis direction, and a joint 23 for joining the arm proximal part 21 to the arm body part 24. The arm proximal part 21 is swingably supported inside the cabinet 6 through a support shaft 5. The joint 23 is formed on the exposed end 22 of the arm proximal part 21 and also, the end of the side of the cabinet 6 in the arm body part 24 is joined to the joint 23. The stylus 4 is detachably attached to the distal end 3 of the arm body part 24. The stylus 4 downwardly projects from the distal end 3.

The arm proximal part 21 is supported by the support shaft 5 turnably in an R direction with respect to the cabinet 6, and a back end 25 of the arm proximal part 21 is displaced in the Z-axis direction with a turn, that is, a swing of the arm 7 in the R direction.

The arm body part 24 is detachably joined to the joint 23 and accordingly, the arm body part 24 located in the outside of the cabinet 6 can easily be replaced.

The support shaft 5 is constructed of rolling bearings or sliding bearings using a low-friction material, and is arranged along an axis line of a Y-axis direction orthogonal to the X axis and the Z axis.

The arm lifter 8 is the attitude change mechanism constructing the invention, and is constructed of a cam mechanism 33.

The cam mechanism 33 has a rotating device 32 made of an electric motor etc., and a cam 31 eccentrically joined to a shaft of the rotating device 32. The cam 31 makes contact with the arm proximal part 21 in the side (side of the back end 25) opposite to the stylus 4 with the support shaft 5 sandwiched. In an initial position of the cam 31, the cam 31 is non-contact with the arm 7, and by rotation of the rotating device 32, the cam 31 makes contact with the arm 7 in the edge and by further rotation, the arm 7 is separated and swung from the work W. By this separation, and swing, the arm 7 can be arranged in any position within the swing range and, for example, the arm 7 can be arranged in the intermediate position P3 or the separation position P4. In the present embodiment, a swing by which the arm 7 arranged in the separation position P4 or the intermediate position P3 moves nearer to the work W is restricted by the cam 31.

Also, when the cam 31 is in the initial position, the arm 7 can be swung in all the swing range. In this case, when the arm 7 is urged by the measuring force giving mechanism 11 and is swung and moved nearer to the work W and the stylus 4 makes contact with the work W, the arm 7 is arranged in the measurement position P2. When the work W is not present on the table 2, the arm 1 is arranged in the pause position P1 making contact with the stopper 15.

The arm lifter 8 arranges the arm 7 in each of the pause position P1, the separation position P4, the intermediate position P3 and the measurement position P2 based on control of the controller 9.

At the time of measurement, the stylus 4 makes contact with the work surface S of the work W installed on the table 2, and this contact inhibits a swing by which the arm 7 moves nearer to the work W. In this case, the arm 7 does not reach the pause position P1 and is arranged in the measurement position P2.

The detector 10 is installed in the side (side of the back end 25) opposite to the stylus 4 with the support shaft 5 sandwiched, and detects displacement of a specific region of the arm proximal part 21 in the Z-axis direction. Accordingly, a turning angle of the arm proximal part 21 can be detected. Then, displacement in the Z-axis direction and swing displacement in the R direction of the stylus 4 and the arm 7 can be computed from the detected turning angle and a distance between the stylus 4 and the support shaft 5. The signal processing and computation are executed by a processing program of the controller 9.

Also, the detector 10 is constructed so that a position of the arm 7 at the time of turning on a power source of the contour measuring apparatus 1 is set as the origin. Since the arm 7 is arranged in the pause position P1 at the time of turning on the power source, the origin set in the detector 10 is the pause position P1.

The measuring force giving mechanism 11 is mechanical urging means constructed of a coil spring, and is installed in the side opposite to the stylus 4 with the support shaft 5 sanded, and is bridged between the cabinet 6 and the arm proximal part 21.

By this measuring force giving mechanism 11, the back end 25 of the arm proximal part 21 is urged upwardly in the Z-axis direction and in the opposite side (side of the distal end 3), the arm body part 24 and the stylus 4 are urged downwardly in the Z-axis direction and accordingly, the stylus 4 changes to a state making contact with the work surface S by a predetermined measuring force.

The controller 9 is connected to the arm lifter 8, the detector 10 and the feed mechanism 13.

The controller 9 is constructed of, for example, a personal computer having a CPU (central processing unit), a memory (storage device) and an input device, and controls operation of the arm lifter 8 and the feed mechanism 13 based on an operation program recorded previously.

The controller 9 includes a main routine for controlling measurement operation described below, and a subroutine for controlling origin return operation described below. The controller 9 executes this subroutine in the case of being set in an origin return mode of executing the subroutine. The origin return mode is preset in the controller 9 based on a manipulation etc. of the input device.

In the contour measuring apparatus 1 of the present embodiment, measurement operation is performed under the control of the controller 9.

In the case of measurement, the work W placed on the table 2 in a state in which the arm 7 is arranged in the separation position P4 by the arm lifter 8. Thereafter, by the arm lifter 8, the arm 7 is swung in the R direction so that the arm 7 is moved nearer to the work W, and the cabinet 6 is arranged so as to change to a state in which the stylus 4 makes contact with the work surface S. At this time, the arm 7 becomes arranged swingably in the measurement position P2.

Then, while a control signal based on the main routine is sent from the controller 9 and the arm 7 is moved in the X-axis direction by the feed mechanism 13, a detection signal from the detector 10 is recorded and thereby, a shape of the work surface S is measured as Z-axis displacement along the X-axis direction.

The controller 9 controls the origin return operation of returning the arm 7 to the pause position P1 by the arm lifter 8 in addition to the measurement operation described above. This control is performed along each step shown in a flow diagram of FIG. 4.

Figure 4:
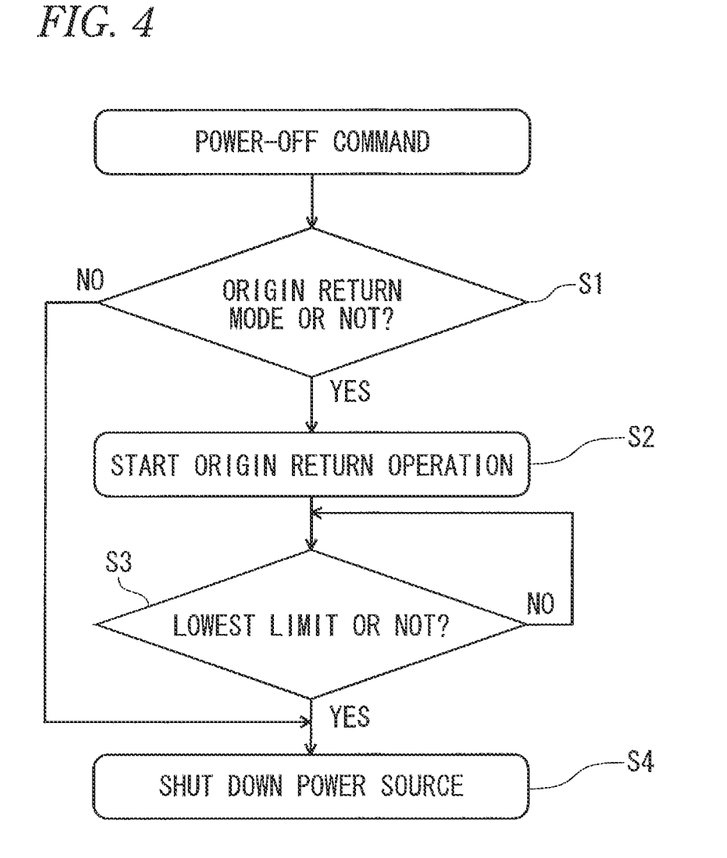
FIG. 4 is a flow diagram showing steps of origin return operation of the first embodiment.

First, when the controller 9 receives a power-off command generated by a manipulation of the power-off switch 34 or an input manipulation etc. of the input device, the controller 9 decides whether or not it is in an origin return mode at the time of this receiving (step S1)

In the case of deciding that it is in the origin return mode in step S1, the subroutine is executed, and the cam 31 is rotated to an initial position so that the arm 7 becomes swingable in the R direction to the pause position P1. Accordingly, the origin return operation to the pause position P1 based on a measuring force of the measuring force giving mechanism 11 or the own weight of the arm 7 is performed (step S2)

After the origin return operation in step S2, it is decided whether or not the arm 7 is in the pause position P1, in other words, the stylus 4 is in the mechanical lowest limit based on detection of the detector 10 (step S3).

In the case of deciding that the arm 7 is not in the pause position P1 in step S3, decision of this step S3 is again made. This second decision may be made every predetermined time and also, may be made at any time.

In the case of deciding that the arm 7 is in the pause position P1 in step S3, the subroutine is completed and the power source is shut down (step S4).

In addition, in the case of deciding that it is not in the origin return mode in step S1, the power source is shut down in step S4 without executing the subroutine.

By shutting down the power source through each of the steps described above, the arm 7 is always in the pause position P1 at the time of turning on the power source. As a result, the detector 10 started at the time of turning on the power source can speedily set (zero) the pause position P1 as the origin without swinging the arm 7 by the arm lifter 8.

In addition, the subroutine described above is preferably embodied by software since the range of application can be extended, but the subroutine is not limited to this software and, for example, the subroutine may be embodied by firmware.

According to the contour measuring apparatus 1 described above, since the arm lifter 8 is operated to automatically return the arm 7 to the pause position P1 based on the power-off command by the controller 9, a distance between the stylus 4 and the table 2 can be decreased automatically. Since the pause position P1 is a mechanical limit position in which the arm 7 moves nearest to the table 2 herein, the distance between the stylus 4 and the table 2 can be decreased to a minimum.

Consequently, the possibility of applying an unintended external force to the stylus 4 or the arm 7 because a foreign substance is interposed between the stylus 4 and the table 2 and also a person touches unexpectedly can be reduced greatly, and damage to the arm 7 or a chip on the stylus 4 due to the external force can be prevented.

Also, replacement work associated with the damage to the arm 7 or the chip on the stylus 4 can be eliminated and also, an increase in operational costs can be avoided. Further, the need to call attention to a worker in the case of turning off the power source can be eliminated.

Further, according to the contour measuring apparatus 1, even in the case of using the incremental type detector 10, the arm position at the time of turning on the power source, that is, the pause position P1 is set as the origin as it is, with the result that the need for the origin return operation at the time of starting can be eliminated, and processing can be reduced and time can be shortened.

[Second Embodiment]

Figure 5:
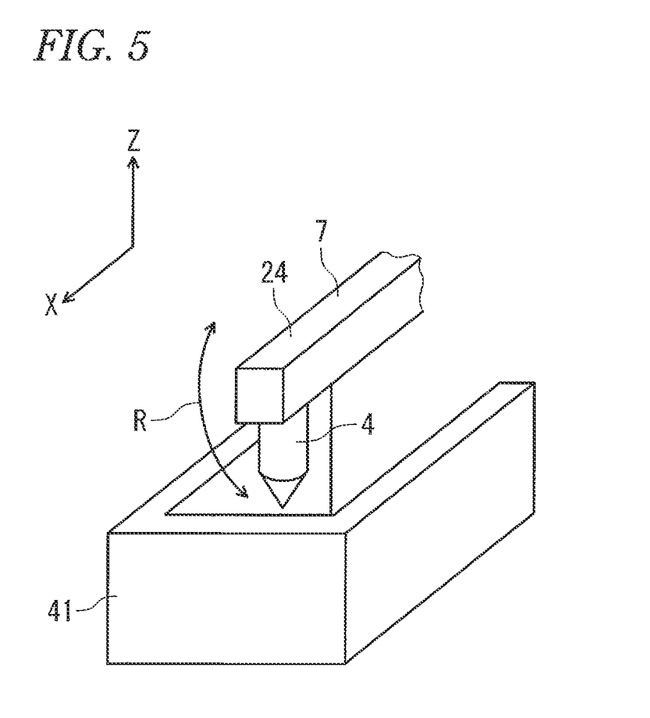
FIG. 5 is a perspective view showing a cover member of a contour measuring apparatus according to a second embodiment of the invention.

A contour measuring apparatus 1 according to a second embodiment of the invention further includes a cover member 41 for covering a stylus 4 of an arm 7 present in a pause position P1 as shown in, for example, FIG. 5.

In addition, in the present embodiment, the same numerals are used in configurations similar to those of the first embodiment and the overlap description is omitted.

The cover member 41 can be attached to and detached from a table 2, and is installed on the table 2 after work W is taken out, and is configured to cover the stylus 4 of the arm 7 present in the pause position P1.

The cover member 41 shown in FIG. 5 has a U shape in plan view, and the stylus 4 can be taken into and out of the upper portion of the cover member 41, but the cover member 41 is not limited to this shape, and may be embodied by, for example, a vise or a V-shaped block installed on the table 2. In this case, the stylus 4 can be protected by arranging the stylus 4 in, for example, a gap of the vise or a groove of the V-shaped block.

According to the contour measuring apparatus 1 of the present embodiment, the stylus 4 can be protected by the cover member 41 at the time of turning off a power source by covering the stylus 4 of the arm 7 present in the pause position P1 with the cover member 41 in addition to the action and effect described above. Accordingly, an unintended external force can more surely be prevented from being applied to the stylus 4.

[Modified Example]

In addition, the invention is not limited to the embodiments described above, and the invention includes modifications etc. without departing from the object of the invention.

In the embodiments described above, the separation position P4 may be set in a position in which the arm 7 makes contact with the upper edge of the cabinet 6, that is, the mechanical uppermost limit position. In this case, the swing range of the arm 7 can be used to the maximum.

In the embodiments described above, the arm lifter 8 may include, for example, an extending and retracting mechanism arranged in the arm 7 based on a swing force in the R direction separated from the work W by extension and retraction of a retractable member instead of the cam mechanism 33, and also include a mechanism using a linear motor mechanism. Further, a mechanism including a voice coil for urging the arm 7 in the R direction may be used.

The swing direction (R direction) is a vertical direction in the present embodiments, but may be a horizontal direction and also, may be an oblique direction other than the vertical direction or the horizontal direction.

In the embodiments described above, the stylus 4 projects downwardly, but has only to be constructed so that a contour shape of the work surface S can be measured, and within this range, the stylus 4 may project, for example, upwardly or in the horizontal direction and also, in the oblique direction other than the vertical direction or the horizontal direction.

In the embodiments described above, the detector 10 could detect displacement in any region of the arm proximal part 21, and as displacement detection, optical displacement detection etc. can be used in addition to an electromagnetic method of a differential coil etc.

In the embodiments described above, the measuring force giving mechanism 11 is not limited to a mechanical elastic member such as the coil spring as the urging means, and may use other elastomer materials, and may further use means for electromagnetically generating a measuring force or means for generating a measuring force by a gravity balance. Also, a region of installation of the measuring force giving mechanism 11 may be any place of the arm 7 as long as a predetermined measuring force can be given.

In the embodiments described above, the lower edge of the cabinet 6 constructing the stopper 15 may be chamfered.

The invention can he used in a contour measuring apparatus for measuring a contour shape of an object to be measured.

What is claimed is:

1. A contour measuring apparatus comprising:
    an arm including a stylus in a distal end and being swingable with respect to a cabinet;
    an attitude change mechanism configured to change an attitude of the arm within a swing range;
    a stopper configured to make contact with the arm when the arm moves nearer to a table for mounting an object to be measured within the swing range; and
    a controller configured to operate the attitude change mechanism based on a power-off command and return the arm to a mechanical limit position in which the arm makes contact with the stopper.

2. The contour measuring apparatus as claimed in claim 1, further comprising
    an incremental type detector configured to detect displacement of the arm, wherein the controller sets an arm position at the time of turning on a power source as the origin.

3. The contour measuring apparatus according to claim 1, further comprising
a cover member configured to cover the stylus of the arm present in the mechanical limit position.

4. The contour measuring apparatus according to claim 1, wherein the stopper is a portion of the cabinet.

5. The contour measuring apparatus according to claim 2, wherein the incremental type detector is configured to detect whether the arm is in contact with the stopper.

6. The contour measuring apparatus according to claim 5, further comprising a processor, wherein when the incremental type detector detects that the arm is in contact with the stopper, and the processor shuts down a power source for the contour measuring apparatus.

7. The contour measuring apparatus according to claim 5, further comprising a processor, wherein when the incremental type detector detects that the arm is not in contact with the stopper, and the incremental type detector is configured to detect again whether the arm is in contact with the stopper.

8. The contour measuring apparatus according to claim 1, wherein the cabinet has an opening, the arm is positioned to pass through the opening, and the stopper is a peripheral edge of the opening.

9. The contour measuring apparatus according to claim 1, wherein the cabinet has an opening, the arm is positioned to pass through the opening, and the stopper is a bottom edge of the opening.

10. The contour measuring apparatus according to claim 1, further comprising a support shaft that swingably supports the arm,
wherein the attitude change mechanism comprises a cam;
when the arm is separated from the object to be measured in the swing range, the cam is in contact with an opposite end of the arm with respect to the distal end where the stylus is attached to the arm; and
when the arm is in contact with the stopper, the cam is not in contact with the opposite end of the arm.

\* \* \* \* \*